United States Patent [19]

Chang et al.

[11] Patent Number: 4,622,084
[45] Date of Patent: Nov. 11, 1986

[54] METHOD OF SEALING A MOUNT IN A CATHODE-RAY TUBE

[75] Inventors: Kern K. N. Chang; Anthony R. Cooke, both of Mercer County; Kurt J. Sonneborn, Tewkesbury Township, Hunterdon County, all of N.J.

[73] Assignee: RCA Corporation, Princeton, N.J.

[21] Appl. No.: 696,158

[22] Filed: Jan. 29, 1985

[51] Int. Cl.$^4$ ............................................. C03C 27/10
[52] U.S. Cl. .................................. 156/89; 65/32; 65/43; 220/2.1 A; 220/2.3 A; 445/2; 445/56
[58] Field of Search ................. 156/89; 65/32, 36, 43; 220/2.1 A, 2.3 A; 313/364, 477, 479, 482; 445/2, 56

[56] References Cited

U.S. PATENT DOCUMENTS

| | | | |
|---|---|---|---|
| 2,273,437 | 2/1942 | Dunn | 65/43 |
| 2,334,718 | 11/1943 | Lowry et al. | 445/56 |
| 2,512,971 | 6/1950 | Roovers | 65/32 |
| 2,817,046 | 12/1957 | Weiss | 65/43 |
| 2,902,796 | 9/1959 | McDuffee | 65/32 |
| 2,908,838 | 10/1959 | Nordberg | 65/32 |
| 3,063,777 | 11/1962 | Trax | 445/2 |
| 3,183,361 | 5/1965 | Bronson et al. | 65/32 |
| 3,290,132 | 12/1966 | Banks | 65/32 |
| 3,337,322 | 8/1967 | Taylor | 65/32 |
| 3,536,462 | 10/1970 | Eyster et al. | 65/32 |
| 4,194,643 | 3/1980 | Hager et al. | 220/2.1 A |

Primary Examiner—Caleb Weston
Attorney, Agent, or Firm—E. M. Whitacre; D. H. Irlbeck; T. H. Magee

[57] ABSTRACT

A method of sealing an electron gun mount of a cathode-ray tube to a back section thereof comprises the steps of applying a glass frit between an edge of the back section and the mount where the sealing is to be effected, heating the glass frit to a temperature sufficient to cause the frit to become vitreous, thereby sealing the mount to the back section, and flowing a gas containing a reducing agent past the electron gun during the heating step.

9 Claims, 1 Drawing Figure

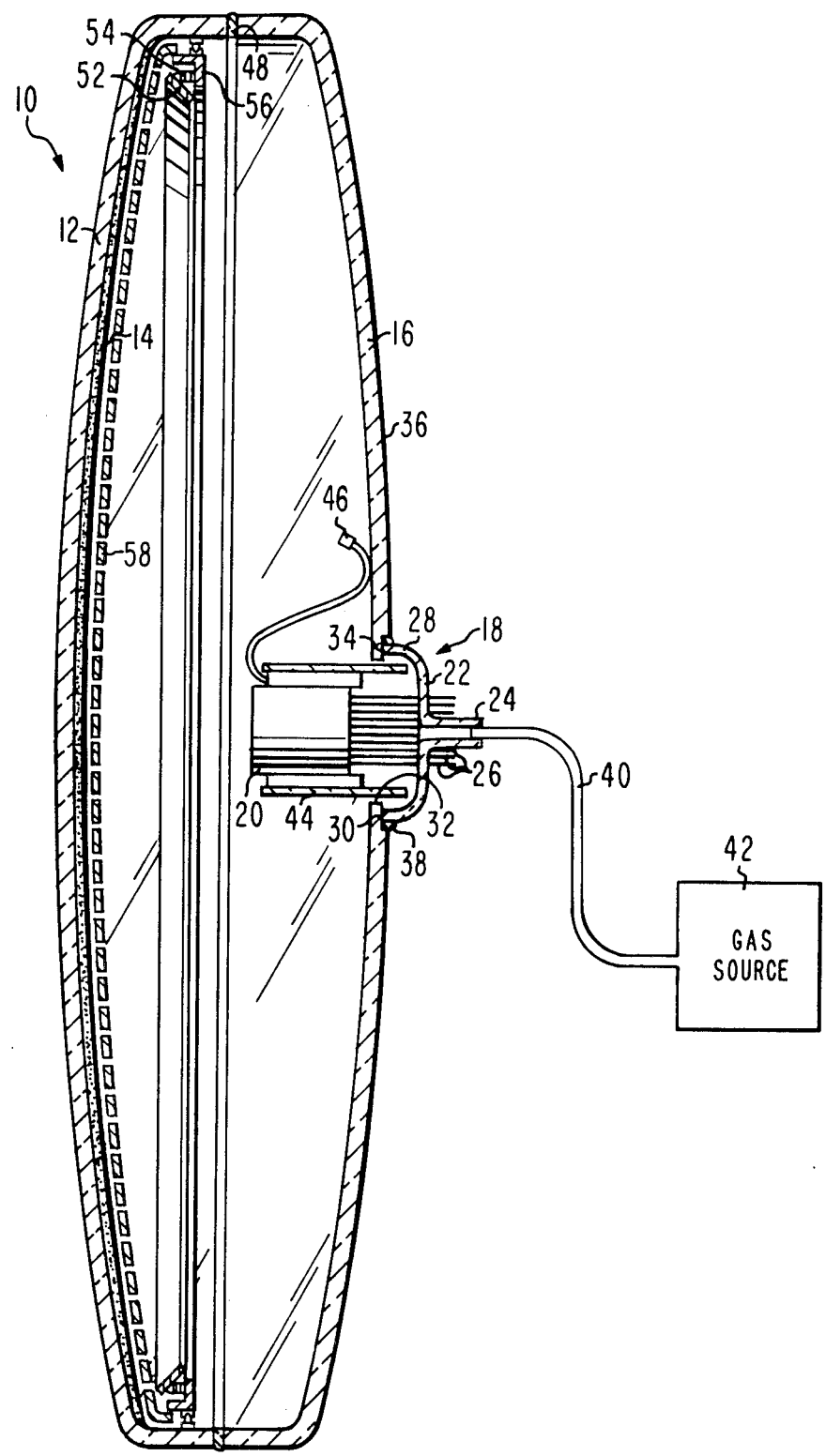

METHOD OF SEALING A MOUNT IN A CATHODE-RAY TUBE

BACKGROUND OF THE INVENTION

This invention pertains to a method of sealing an electron gun mount in a cathode-ray tube.

In manufacturing a cathode-ray tube comprising a panel assembly with a phosphor screen, a funnel-shaped back section having a neck, and a mount containing an electron gun, the back section typically is sealed to a faceplate panel of the panel assembly using a glass frit before the mount is sealed to the neck of the funnel-shaped back section. Since the frit-sealing step is performed in a high-temperature oven or lehr at a temperature of about 450° C., it is desirable that the electron gun not be subjected to this heating step in order to prevent the cathode of the gun from being oxidized and exposed to contamination originating from the heated glass frit. Therefore, the mount is sealed to the neck of the back section after the frit-sealing step by a flame-sealing apparatus which applies a 1,000° C. torch only to a localized area around the neck where the seal is to be formed. Exhausting and a final tubulation seal are then performed.

In order to improve the focusing capability of the cathode-ray tube and also make the tube as thin as possible, the mount containing the electron gun must be positioned closer to the phosphor screen. The geometrical considerations for the design of such a thin tube require a differently shaped back section which may not include a neck capable of being flame sealed, thereby precluding the feasibility of utilizing the aforementioned mount-sealing step wherein a torch is applied to the neck. The present invention provides a method of sealing the mount of the cathode-ray tube to the back section thereof during the frit-sealing step, thereby achieving a thinner tube.

SUMMARY OF THE INVENTION

The present invention comprises a method of sealing an electron gun mount of a cathode-ray tube to a back section thereof. The method comprises the steps of applying a glass frit between an edge of the back section and the mount where the sealing is to be effected, heating the glass frit to a temperature sufficient to cause the frit to become vitreous, thereby sealing the mount to the back section, and flowing a gas containing a reducing agent past the electron gun during the heating step.

BRIEF DESCRIPTION OF THE DRAWING

The drawing is a diagrammatic cross-sectional view illustrating a thin cathode-ray tube and a method utilized for making the tube.

DETAILED DESCRIPTION OF THE PREFERRED EMBODIMENT

The drawing shows a thin cathode-ray tube 10 comprising a faceplate panel 12 having a phosphor screen 14 and a back section 16 attached thereto. The back section 16 supports a mount 18 including an electron gun 20 which is pointed in a direction othogonal to the phosphor screen 14. In the present embodiment, the mount 18 comprises a glass dome 22 which has a tubulation 24 for exhausting the tube 10, and also has wire leads 26 extending therethrough for supporting the electron gun 20. The glass dome 22 has a base 28 which is frit sealed to an edge 30 of an aperture 32 disposed in the back section 16. Preferably, the base 28 of the dome 22 is supported by and sealed to a recessed ledge 34 disposed around the edge 30 of the aperture 32.

The back section 16 of the thin cathode-ray tube 10 has a surface boundary 36 which is substantially symmetrical in shape to that of the faceplate panel 12. The surface boundary 36 is defined as the outer or exposed surface area of the back section 16. Preferably, the back section 16 comprises a panel which is substantially identical to the faceplate panel 12. In other words, the back section 16 of the tube 10 may comprises a panel which has been rejected for use as a faceplate panel due to poor optical characteristics. In order to make the cathode-ray tube 10 as thin as possible, the mount 18 containing the electron gun 20 must be positioned closer to the phosphor screen 14 than the spacing in prior-art tubes. In order to accomplish this, it is critical to the present invention that the electron gun 20 be disposed within the symmetrical boundary 36, so that it does not protrude therefrom similar in manner to the necks of prior-art tubes. The method described below provides a technique for frit sealing the mount 18 of the thin cathode-ray tube 10 to a back section 16 thereof.

In the present novel method, a glass frit 38 is applied between the aperture edge 30 of the back section 16 and the mount 18 where the sealing is to be effected. The glass frit 38 is heated to a temperature sufficient to cause the frit 38 to become vitreous, thereby sealing the mount 18 to the back section 16. A flushing gas containing a reducing agent is flowed past the electron gun 20 during the sealing step. The rate of flow of the flushing gas should be between about 275 liters per hour and about 425 liters per hour. In the present embodiment, the rate of flow is approximately 400 liters/hour, and the gas comprises forming gas containing about 90% nitrogen and about 10% hydrogen by volume. As illustrated by the drawing, the flushing gas is provided by a hose 40 connected between the tubulation 24 and a gas source 42. The source 42 provides flushing gas to the end of the tubulation 24 at a predetermined flow rate during the heating step.

In the present embodiment, the flowing step is performed by surrounding the electron gun 20 with a container 44, and flowing the gas through the container 44 which, preferably, comprises a glass tube. The present method does not require such a container 44, but it helps to confine and maintain a relativley high concentration of flushing gas near the cathode of the electron gun 20. In the present embodiment, the mount 18 also includes a frittable getter 46 capable of withstanding the high-temperature heating step. Such a frittable getter 46 may be coated with aluminum which enables it to survive temperatures as high as 450° C. In addition, in the present example, a glass frit 48 is also applied between the back section 16 of the cathode-ray tube 10 and the faceplate panel 12 prior to the heating step, whereby the heating step also seals the back section 16 to the faceplate panel 12 simultaneously.

The essence of the present novel method is the discovery that the mount 18 containing the electron gun 20 can be successfully frit sealed to the back section 16 of the tube 10 without oxidizing and exposing the cathode of the gun 20 to contamination originating from the heated glass frit. Under different experimental conditions, as shown by Examples 1 through 8 in TABLE I, the mount 18 was sealed to the back section 16 of the cathode-ray tube 10, and then the electron emission of the electron gun 20 was measured in each Example. The prior-art technique, wherein the mount 18 is flame-sealed with a 1,000° C. torch in ambient air, is shown in Example 1; the gun emission current was subsequently measured at 3.5 milliamperes (mA) which represents a satisfactory level of electron current.

TABLE I

| | TYPE OF SEAL | GAS | FLOW RATE (liters/hr) | GUN EMISSION (mA) |
|---|---|---|---|---|
| Example 1 | 1,000° C. Torch | Ambient Air | — | 3.5 |
| Example 2 | 450° C. Frit | Ambient Air | — | 0.3 |
| Example 3 | 450° C. Frit | Nitrogen | 275 | 1.0 |
| Example 4 | 450° C. Frit | Nitrogen | 425 | 2.5 |
| Example 5 | 450° C. Frit | Forming Gas | 150 | 0.4 |
| Example 6 | 450° C. Frit | Forming Gas | 275 | 3.0 |
| Example 7 | 450° C. Frit | Forming Gas | 425 | 5.8 |
| Example 8 | 450° C. Frit | Forming Gas | 450 | 5.8 with Carbon Deposit & Destabilized Frit |

In examples 2 through 8, the mount 18 was frit sealed to the back section 16 of the tube in a furnace at a temperature of about 450° C. Example 2 was carried out in ambient air, resulting in a gun emission current of only 0.3 milliampere. Nitrogen was utilized as a flushing gas in Examples 3 and 4. In Example 3, the flow rate of the nitrogen was 275 liters/hour, resulting in a gun emission current of about 1.0 milliampere. In Example 4, the nitrogen flow rate was 425 liters/hour, and resulted in an emission current of 2.5 milliamperes.

Forming gas was utilized as the flushing gas in Examples 5 through 8 wherein flow rates of 150, 275, 425 and 450 liters/hour resulted in gun emission currents of 0.4, 3.0, 5.8 and 5.8 milliamperes, respectively. In Example 7, a slight carbon deposit was noted within the tube 10, attributable to a lack of oxygen during the heating step. A heavier carbon deposit was noted in Example 8, along with the observation that the glass frit adjacent the faceplate panel 12 was starting to become destabilized due to an outward force pushing on the frit caused by high internal pressure. Carbon deposits should be avoided because they tend to cause arcing within the tube. In addition, we found that the flow rate of 450 liters/hour depletes, near the frit 48, the oxygen needed for the formation of a proper glass frit seal. In other words, the metal-oxide constituent in the sealing glass has a propensity to be reduced to a metal during the course of heat sealing in an atmosphere lacking oxygen, thereby causing a poor frit seal.

TABLE I shows that, in order to prevent the cathode of the gun 20 from being oxidized and exposed to other contamination which degrades its emission, the flushing gas should contain a reducing agent such as hydrogen. Furthermore, in the present embodiment, we have shown that it is desirable to maintain the flow rate of the flushing gas between about 275 liters per hour and about 425 liters per hour. If the flow rate is below 275 liters/hour, the cathode of the electron gun 20 may not be effectively protected, resulting in unsatisfactory emission currents. A flow rate in excess of about 425 liters/hour not only destabilizes the glass frit but also depletes, near the frit, the oxygen that is vitally needed for a proper seal formation.

The present novel method and cathode-ray tube design has several significant advantages. The single frit-sealing step eliminates the additional mount-sealing step of the prior art wherein a localized torch is applied to the neck of the tube. Also, the electron gun 20 supported by the dome 22 may now be prealigned. Our novel method has unique application to cathode-ray tubes with a short neck or no neck, thereby allowing for the manufacture of a thinner tube. In particular, the novel method allows for a cathode-ray tube enclosure made of two symmetrical and identical panels. Thus, only one glass mold is needed, and those panels rejected for use as faceplate panels may now be used as back sections. The concept of utilizing back-to-back panels not only provides for a geometrically thinner cathode-ray tube, but also a tube which is structurally more stable and ultimately safer.

What is claimed is:

1. A method of sealing a mount of a cathode-ray tube to a back section thereof comprising the steps of:
    applying a glass frit between an edge of said back section and said mount where the sealing is to be effected,
    heating the mount and glass frit within a furnace to a temperature sufficient to cause said frit to become vitreous, thereby sealing said mount to said back section, and
    flowing a gas containing hydrogen past an electron gun disposed in said mount during said heating step.

2. A method as recited in claim 1 wherein said flowing step is performed by surrounding said electron gun with a container, and flowing said gas through said container.

3. A method as recited in claim 2 wherein said container comprises a glass tube, and wherein a glass tubulation of said mount is connected to a hose for providing the gas to said container.

4. A method as recited in claim 1 further comprising the step of applying glass frit also between said back section and a faceplate panel of said cathode-ray tube prior to the heating step, whereby said heating step also seals said back section to said faceplate panel simultaneously.

5. A method as recited in claim 1 wherein said rate of flow is between about 275 liters/hour and about 425 liters/hour.

6. A method as recited in claim 5 wherein said flow rate is approximately 400 liters/hour.

7. A method as recited in claim 5 wherein said gas comprises forming gas containing about 90% nitrogen and about 10% hydrogen by volume.

8. A method as recited in claim 1 wherein said mount includes a frittable getter capable of withstanding said high-temperature heating step.

9. A method as recited in claim 8 wherein said frittable getter is coated with aluminum.

* * * * *